United States Patent [19]
Nash

[11] 3,941,942
[45] Mar. 2, 1976

[54] TWO OF EIGHT TONE ENCODER
[75] Inventor: Harold G. Nash, Tempe, Ariz.
[73] Assignee: Motorola, Inc., Chicago, Ill.
[22] Filed: Jan. 2, 1974
[21] Appl. No.: 430,377

[52] U.S. Cl. .............................................. 179/90 K
[51] Int. Cl.[2] .................... H04M 1/50; H03K 13/02
[58] Field of Search . 179/90 R, 90 K, 2 DP, 84 VF, 179/90 B; 340/347 DA

[56] References Cited
UNITED STATES PATENTS

| 3,538,256 | 11/1970 | Lucas | 179/90 K |
| 3,778,556 | 12/1973 | Mees et al. | 179/90 K |
| 3,778,557 | 12/1973 | Frederiksen | 179/90 K |
| 3,787,836 | 1/1974 | Hagelbarger | 340/347 DA |

Primary Examiner—William C. Cooper
Assistant Examiner—Joseph Popek
Attorney, Agent, or Firm—Harry M. Weiss; Charles R. Hoffman

[57] ABSTRACT

A two of eight tone encoder utilizing digital techniques to synthesize the dual tones of a Touch Tone telephone operator system is provided. One of sixteen switches from the telephone keyboard selects one of four desired row tones and one of four desired column tones. The two of eight encoder circuit includes, for the row encoding section, a counter which is programmable by the row input signals. The counter output drives a plurality of exclusive OR gates and a one of eight decoder which switches one of eight resistors into a resistive divider network. The exclusive OR gates and the one of eight decoder cooperate to perform an up-down counting function. The eight resistors are chosen in value so that a synthesized stepped sine wave is generated at the output of the resistive divider network, the synthesized stepped sine wave corresponding to the desired selected row frequency. Similar circuitry generates a stepped sine wave corresponding to the desired selected column frequency. The two stepped sine waves are filtered, if desired, and provided as inputs to a summation amplifier, the output of which produces the desired tone having the frequency components for both the selected row input and the selected column input.

10 Claims, 4 Drawing Figures

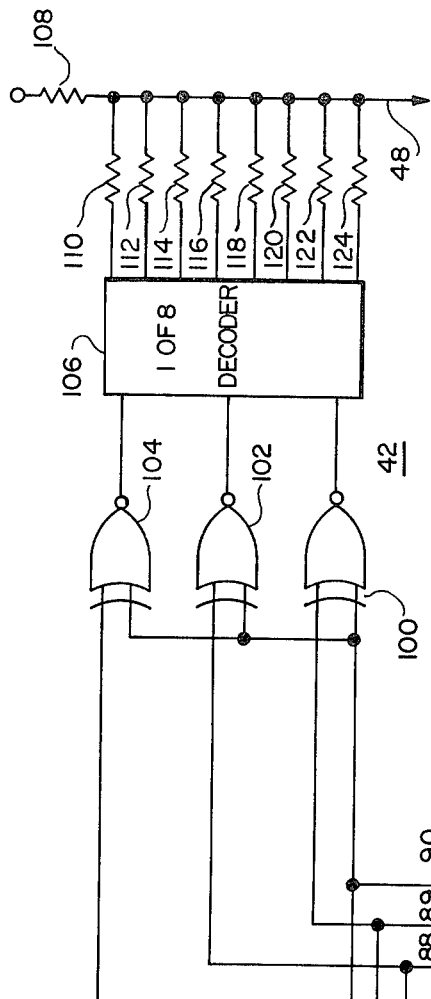
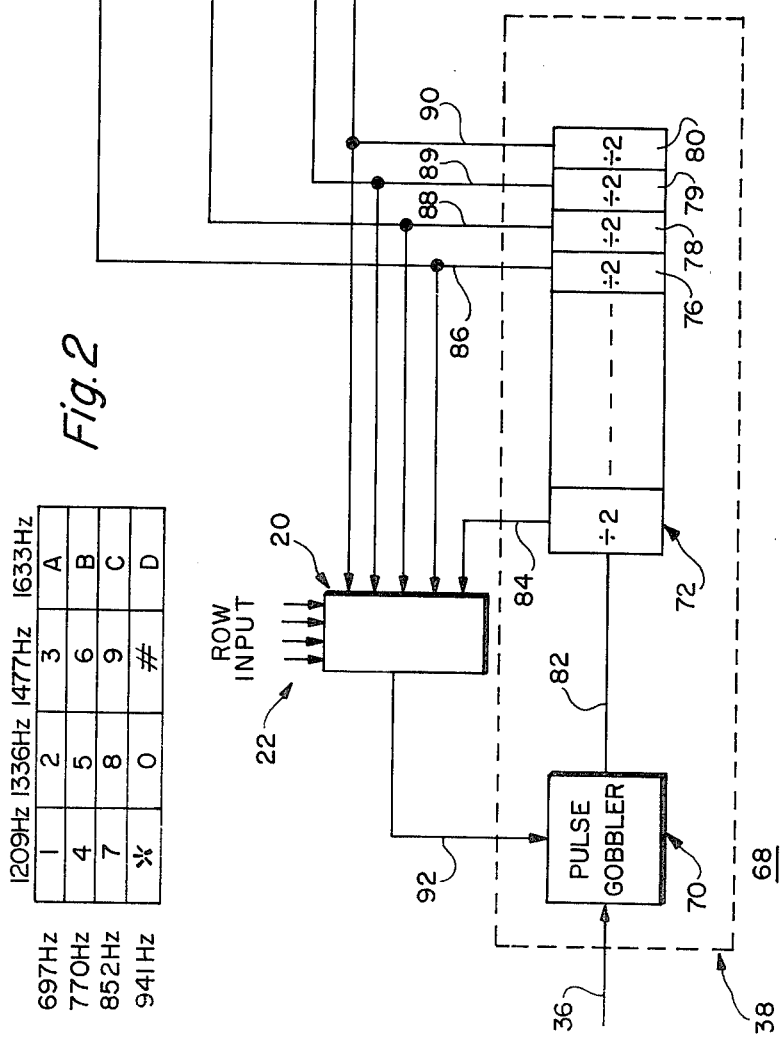
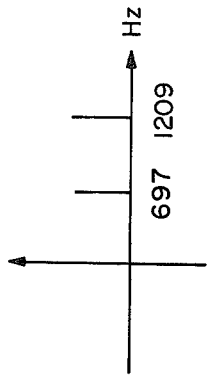

TWO OF EIGHT TONE ENCODER

BACKGROUND OF THE INVENTION

Modern telephone systems use tone dialing, and require tone encoders to generate dual frequencies corresponding to one of 16 keys activated from the telephone keyboard. For example, in order to transmit a signal representing a five, the two frequencies, 770 Hz and 1336 Hz are transmitted. Present methods of implementation utilize a bridge-stabilized oscillator employing a T-network bridged by mutual inductance. Two separate tunable inductors are used as a portion of the frequency controlling device. Thus, factory calibration is a requirement. The achievable frequency tolerance is approximately ±1.5 percent with initial adjustment, temperature, and aging being the primary controlling factors. Such oscillators also possess the characteristic of frequency pulling. In other words, the row frequency determining elements are not truly independent of the column frequency determining elements.

SUMMARY OF THE INVENTION

It is an object of this invention to provide a tone encoder.

It is another object of this invention to provide a digital tone encoder which synthesizes a selected frequency.

It is another object of this invention to provide a two of eight tone encoder for synthesizing the dual tones required in telephone tone dialing systems.

It is another object of this invention to provide a two of eight tone encoder which includes a single crystal oscillator, programmable dividing circuitry, a digital to analog converter, and a summation amplifier.

Briefly described, the invention is a X of Y tone encoder for synthesizing multiple tones for tone encoding systems, where X and Y are integers. A preferred embodiment of the invention is a two of eight tone encoder for synthesizing the dual tones for telephone tone dialing systems. A single crystal controlled oscillator is coupled to dividing circuitry which generates a suitable clock signal. The dividing circuitry is coupled to row tone synthesizing circuitry and column tone synthesizing circuitry. The row tone synthesizing circuitry includes a programmable counter clocked by the clock signal. The programmable counter is controlled by row control circuitry having four row inputs corresponding to one of four possible tones corresponding to one of the four rows of the keyboard matrix. In one embodiment, the row control circuitry controls the programmable counter by controlling the feedback from divider circuitry to a pulse gobbler circuit which is coupled between the clock signal conductor and divider circuitry of the programmable counter. The four most significant bit outputs of the first programmable counter are coupled to exclusive OR (or exclusive NOR) circuitry and functions in combination therewith as an up-down counter. The outputs of the exclusive OR circuitry are coupled to a decoder circuit; the outputs of which sequentially switch one of eight resistors into a resistive divider circuit. The resistive divider circuit may be designed to be a stepped sine wave generated by appropriately selecting the various resistor ratios. The column tone synthesizing circuitry is entirely similar to the row tone synthesizing circuitry. The stepped sine waves produced by each are fed into a summation amplifier circuit coupled to the column and row tone synthesizing circuitry. The output conductor provides the desired signal including the two desired tone frequency components corresponding to the selected row and selected column of the keyboard matrix.

BRIEF DESCRIPTION OF THE DRAWINGS

FIG. 2 is a diagram indicating the four row frequencies and the four column frequencies and their relationship to the touch tone telephone keyboard matrix.

FIG. 3 is a diagram illustrating an embodiment of the counters, decoders and sine wave generators of FIG. 1.

FIG. 4 is a frequency plot of the signal generated by the inventive system when the 1 keyboard button is pushed.

DESCRIPTION OF THE INVENTION

Figure 1:
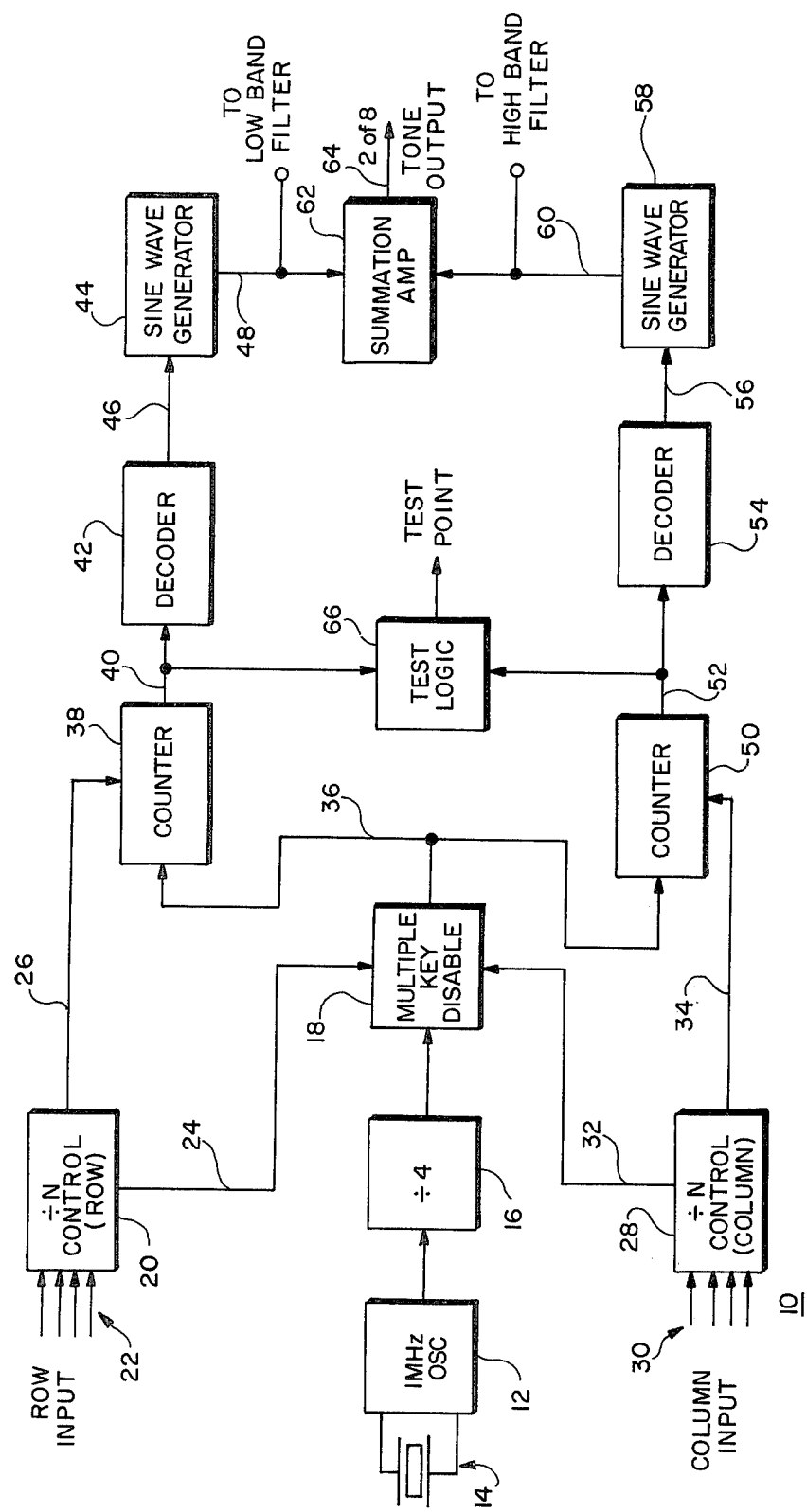
FIG. 1 is a block diagram of a two of eight tone encoder according to the invention.

Referring to FIG. 1, two of eight tone encoding system 10 includes a 1 MHz oscillator 12 controlled by crystal 14. The output of oscillator 12 is coupled to divider circuit 16 to produce a more convenient frequency signal. The output of divider circuit 16 is connected to multiple key disable circuit 18 which disables the clock signals if more than one of the sixteen buttons are pushed on the telephone keyboard matrix. The output of multiple key disable circuit 18 is produced on conductor 36 which is connected to counter 38. Counter 38 is also connected by a plurality of conductors 26 to row control circuit 20. Row control circuit 20 has four row input conductors 22 coupled thereto and is also coupled by means of conductor 24 to multiple key disable circuit 18. Counter 38 is connected to decoder 42 by means of a plurality of conductors 40. The output of decoder 42 is connected to sine wave generator 44 by means of a plurality of conductors 46. The output of sine wave generator 44 appears on conductor 48 which is fed into summation amplifier 62 by means of conductor 48. Counter 50 is connected to conductor 36, and is also connected to column control circuit 28. Column control circuit 28 has four column input conductors 30 connected thereto and is connected to multiple key disable circuit 18 by means of conductor 32. Counter 50 is connected to column control circuit 28 by means of a plurality of lines 34. A plurality of output conductors 52 from counter 50 is connected to decode circuit 54, the output lines 56 of which are connected to sine wave generator 58. The output of sine wave generator 58 is connected to conductor 60 which feeds the synthesized column tone into summation amplifier 62. The output signal of two of eight tone encoder 10 is provided on output conductor 64.

FIG. 2 is a diagram representing a sixteen-key telephone keyboard matrix for tone dialing systems. It is seen that if any of the 16 keys in the 4 × 4 array is activated, one row tone and one column tone of the frequencies indicated in FIG. 2 will be generated by the circuit in FIG. 1.

The circuit in FIG. 1 converts the two synthesized frequencies corresponding to the column and row of the selected key into a single signal having the harmonic content representative of the selected row and column. For example, FIG. 4 shows a frequency diagram corresponding to the case when the key corresponding to the numeral 1 is activated showing a row frequency of 697 Hz and a column frequency of 1209 Hz.

In the diagram of FIG. 3, circuitry 68 includes counter 38, decoder 42, and sine wave generator 44 all of FIG. 1. As shown in FIG. 3, one embodiment of counter 38 may include an 8-bit divider 72 which includes divide by 2 elements 74, 76, 78, 79, and 80, and also includes pulse gobbler 70, which is connected to conductor 36 from FIG. 1. Pulse gobbler circuits are known to those skilled in the art. For example, a circuit which could be called pulse gobbler is described in copending patent application, Ser. No. 280,620 by Earl F. Carlow, filed Aug. 14, 1972 and assigned to the assignee of the present invention, now U.S. Pat. No. 3,792,360. In order to generate the four row frequencies, 697 Hz, 770 Hz, 852 Hz, and 941 Hz, for example, the programmable counter 38 of FIG. 3 divides the signal on conductor 82 by an appropriate divisor. The additional counts required on conductor 36 to divide the 250 KHz frequency on pulse rate on conductor 36 to achieve the row frequencies is obtained by providing appropriate output signals at various bits of counter 72 and feeding them back to pulse gobbler 70 by means of row control circuit 20. The most significant bit 80 of divider 72 is also used as an input to three exclusive OR (or exclusive NOR) gates 100, 102 and 104. The next three most significant bit outputs are provided, respectively, to the exclusive OR gates. The three outputs of the exclusive OR gates are then coupled to one of eight decoder 106, which may consist of eight NAND gates. The counting sequence obtained at the outputs of the gates of one of eight decoder 106 is an up-down counting sequence. If the outputs of one of eight decoder 106 are used to switch one of resistors 110, 112, 114, 116, 118, 120, 122, or 124 to ground. A positive voltage is applied to the upper end of resistor 108, and a periodic signal will appear at conductor 48. The resistor ratios of the above resistors may be chosen so that a stepped sine wave is provided at conductor 48.

The operation of the two of eight tone encoder of FIG. 1 is described as follows. The oscillator 12, which may be 1 MHz, for example, is controlled by crystal 14. For a complementary MOS implementation of the system, 1 MHz is an inconveniently high frequency, so that divider circuit 16 produces a lower, more manageable signal for CMOS circuitry. Multiple key disable circuit 18 interrupts the clock signal if more than one key is activated on the telephone keyboard. A system clock signal then appears on conductor 36, which clocks both programmable counters 38 and 50.

The operation of one type of programmable counter suitable for this application is best understood by referring to FIG. 3. The circuit 10, in order to produce, for example, the 697 Hz row tone required if the 1 key is activated, must divide the 1 MHz oscillator signal by approximately 1440, and in this embodiment the programmable counter 38 must divide the clock signal on conductor 36 by approximately 380, if, for example, circuit 16 divides by 4. One approach to accomplishing this division would be to use a polynominal counter. The approach in FIG. 3, however, is to use a sequential binary counter which counts up to the number which is the highest power of 2 less the desired frequency. Additional counts required to accomplish the division by 380 are obtained by feeding back signals from the various bits of the sequential counter which add up to the number of additional counts required to pulse gobbler 70, which acts to delay or interrupt the signal on conductor 36 by that number of counts. Thus, the desired division by 380 is accomplished. The counter is made programmable by controlling the feedback from the bits of sequential counter 72 to pulse gobbler 70 by means of row control circuitry 20.

The outputs of the four most significant bits, 76, 78, 79 and 80 will count in a normal binary progression. The outputs of 76, 78 and 79 are fed to separate exclusive OR gates 104, 102 and 100, respectively. The most significant bit 80 has its output connected to all three of the exclusive OR gates, and the resultant operation is that every time the most significant bit 80 changes, the counting sequence is inverted. In other words, the counting sequence of bits 76, 78 and 79 counts from 000 up to 111, at which point most significant bit 80 changes and complements the next count, which would be 000, to obtain 111 at the outputs of the exclusive OR gates. During the successive counts, the outputs of exclusive NOR gates 104, 102 and 100 count back to 000. Thus, the last four bits of counter 72 plus the three exclusive NOR gates operate as an up-down counter. Additional bits may be used to provide narrower steps of the stepped sine wave, as described later.

The three binary variables at the outputs of the exclusive NOR gates are decoded to successively select one of eight gates of one of eight decoder 106. Of course, if more bits of counter 72 are used to provide the up-down counting feature, more gates will be required. The gates may, for example, be NAND gates. The outputs of one of eight decoder 106 may, in a CMOS implementation, be connected to MOSFET devices which connect, respectively, resistive devices 110, 112, etc. to ground. Or, alternatively, resistive devices 110, 112, etc. may themselves be MOSFET devices having their gates connected, respectively, to outputs of the eight gates encoded in one of eight decoder 106. The relative resistances of resistor 108 and resistive devices 110, 112, etc. are then chosen so that a stepped sinusoidal waveform appears at conductor 48. The combination of the exclusive OR gates, the decoder, and the resistor network may be thought of as a digital to analog converter.

Referring back to FIG. 1, the stepped sinusoidal waveform on conductor 48 is provided as an input to summation amplifier 62. Summation amplifier 62 may be a circuit such as is described in U.S. patent application Ser. No. 427,752, inventor Harold Garth Nash, filed Dec. 26, 1973, and assigned to the assignee of the present invention. Similarly, the operation of counter 50, decoder 54, and sine wave generator 58 are completely analogous and provide a 1209 Hz stepped sine wave signal on conductor 60 which is also provided as an input to summation amplifier 62. The signal on output conductor 64 is then the sum of the two stepped sine wave signals and has the frequency distribution as shown on the graph of FIG. 4.

Simple roll-off filters can be inserted at conductors 48 and 60 to provide a very clean frequency spectrum. In summary, the invention provides a digital two of eight tone encoder having a number of advantages over the prior art, including the fact that no calibration of inductors is required, and that only a single crystal oscillator is required, high frequency accuracy, the absence of "frequency pulling" and is readily implemented using conventional digital CMOS LSI techniques. Further, the effects of aging of reactive components such as inductors is eliminated.

While the invention has been described in relation to a particular embodiment thereof, those skilled in the art will recognize that variations in placement and connections of components may be made to suit varying requirements in the scope of the invention.

What is claimed is:

1. An X of Y tone encoder for synthesizing X selected tone signals at an output thereof, X and Y being integers, including clock signal input means for generating a reference input signal, comprising:

programmable counting circuit means for counting a preselected one of a plurality of up-down sequences coupled to said clock signal input means, wherein an up-down sequence is a repetitive sequence of numbers wherein each number is incremented from the previous number until all bits of a number are logical 1's, and then each number is decremented from the previous number until all bits of a number are a logical 0;

digital-to-analog conversion circuit means coupled to said programmable counting circuit means for converting digital output signals from said programmable counting circuit means to X analog signals; and a summation amplifier circuit for summing said X analog signals coupled to said digital-to-analog conversion circuit means for producing a single output signal including X selected tone signals.

2. The X of Y tone encoder as recited in claim 1 further including X selection circuits for selecting X of Y tones coupled to said X programmable counting means.

3. The X of Y tone encoder as recited in claim 1 wherein said clock signal input means includes a crystal controlled oscillator circuit for generating said clock signal.

4. A two-of-eight tone encoder for synthesizing two of eight signals at an output thereof comprising:

first and second programmable counter means coupled to an input signal conductor for each generating a preselected one of four up-down counting sequences at a plurality of outputs thereof, wherein an up-down sequence is a sequence of numbers repetitively incremented until all bits of a number are logical 1's and then decremented until all bits of a number are logical 0's;

first and second decoder circuit means coupled, respectively, to said outputs for each selecting, in an up-down sequence, occurrence of binary combinations of logical levels at said plurality of outputs;

first and second switchable resistive circuit means coupled to, respectively, said first and second decoder circuit means for synthesizing first and second stepped sine wave signals at outputs of said first and second switchable circuit means, respectively, by having various resistor ratios selected, respectively, by said first and second decoder means in response to digital signals at outputs of said first and second decoder circuit means; and a summation amplifier circuit for summing said first and second stepped sine wave signals coupled to said outputs of said first and second switching resistive networks.

5. The two of eight tone encoder as recited in claim 4 further including a crystal controlled oscillator coupled to said input signal conductor.

6. The two of eight tone encoder as recited in claim 5 further including a divider circuit coupled between said crystal controlled oscillator and said input signal conductor.

7. A two-of-eight tone encoder as recited in claim 5 wherein said first and second programmable counter means each include a sequential counter and pulse gobbler circuit means coupled to said sequential counter for delaying an input signal to said pulse gobbler means by a number of counts represented by a bit of said programmable counter means and further including digitally controlled feedback circuit means controllably coupled to selected outputs of said sequential counter for controlling feedback from bits of said sequential counter to said pulse gobbler means in response to input signals applied to inputs of said digitally controlled feedback circuit means, said pulse gobbler circuit means having an input coupled to said input signal conductor and an output coupled to said sequential counter.

8. The two of eight tone encoder as recited in claim 7 wherein said first and second programmable counter means include a plurality of exclusive NOR gates each having an input coupled to an output of the most significant bit of said sequential counter, each of said exclusive NOR gates also having an input coupled, respectively, to one of said next most significant bits of said sequential counter.

9. The two-of-eight tone encoder as recited in claim 4 wherein said first and second switching resistive network means each include a first resistive element coupled between a first voltage conductor and an output signal conductor of said switching resistive network means and a plurality of additional resistive elements in parallel individually switchable coupled between said output signal conductor and a second voltage conductor, said additional resistive elements being controllably switchable in response to digital signals at said outputs of said first and second decoder circuit means, respectively.

10. The two-of-eight tone encoder as recited in claim 7 further including multiple key disable circuit means coupled to said input signal conductor and said crystal controlled oscillator circuit and said digitally controlled feedback circuit means and for disabling said input signal as a function of row inputs of said two-of-eight tone encoder.

* * * * *